United States Patent
Kim

(10) Patent No.: US 10,248,235 B2
(45) Date of Patent: Apr. 2, 2019

(54) DISPLAY APPARATUS

(71) Applicant: Dongbu HiTek Co., Ltd., Bucheon-si (KR)

(72) Inventor: Chang Oon Kim, Gwangyu-si (KR)

(73) Assignee: DB HiTek Co., Ltd., Seoul (KR)

(*) Notice: Subject to any disclaimer, the term of this patent is extended or adjusted under 35 U.S.C. 154(b) by 422 days.

(21) Appl. No.: 14/957,384

(22) Filed: Dec. 2, 2015

(65) Prior Publication Data

US 2016/0349891 A1    Dec. 1, 2016

(30) Foreign Application Priority Data

May 29, 2015   (KR) .................. 10-2015-0075985

(51) Int. Cl.
| | | |
|---|---|---|
| *G06F 3/041* | (2006.01) | |
| *G06F 3/044* | (2006.01) | |
| *G09G 3/36* | (2006.01) | |

(52) U.S. Cl.
CPC ........... *G06F 3/0412* (2013.01); *G06F 3/044* (2013.01); *G06F 3/0416* (2013.01); *G09G 3/3648* (2013.01)

(58) Field of Classification Search
CPC ...... G06F 3/0412; G06F 3/044; G06F 3/0416; G09G 3/3648
See application file for complete search history.

(56) References Cited

U.S. PATENT DOCUMENTS

| | | | |
|---|---|---|---|
| 9,019,215 B2 | 4/2015 | Hwang et al. | |
| 9,046,954 B2 | 6/2015 | Kim et al. | |
| 9,058,072 B2 | 6/2015 | Bae et al. | |
| 9,360,978 B2 | 6/2016 | Pak | |
| 2012/0050217 A1* | 3/2012 | Noguchi | G06F 3/0412 345/174 |
| 2012/0242597 A1 | 9/2012 | Hwang et al. | |
| 2013/0342478 A1 | 12/2013 | Bae et al. | |
| 2014/0210771 A1 | 7/2014 | Kim et al. | |
| 2015/0042614 A1 | 2/2015 | Pak | |

(Continued)

FOREIGN PATENT DOCUMENTS

| | | |
|---|---|---|
| KR | 1020130143415 A | 12/2013 |
| KR | 1020140097892 A | 8/2014 |
| KR | 1020150019012 A | 2/2015 |

OTHER PUBLICATIONS

Office Action dated Aug. 19, 2015 for Korean Patent Application No. 10-2015-0075985; 5 pgs.; Korean Intellectual Property Office, Republic of Korea.

(Continued)

*Primary Examiner* — Kenneth Bukowski
(74) *Attorney, Agent, or Firm* — Andrew D. Fortney; Central California IP Group, P.C.

(57) ABSTRACT

Disclosed herein is a display apparatus including a panel in which a display operation and a touch sensing operation occur during one frame, and a controller is configured to drive the panel during the display operation and the touch sensing operation. The controller performs an initialization operation during each of the display operation and the touch sensing operation. The initialization operation is performed (i) before a start of the display operation and/or after an end of the display operation, and (ii) before a start of the touch sensing operation and/or after an end of the touch sensing operation.

15 Claims, 5 Drawing Sheets

(56) References Cited

U.S. PATENT DOCUMENTS

2015/0325171 A1* 11/2015 Zhou .................. G09G 3/3233
　　　　　　　　　　　　　　　　　　　　　　345/80

OTHER PUBLICATIONS

Notice of Allowance dated Oct. 27, 2015 for Korean Patent Application No. 10-2015-0075985; 5 pgs.; Korean Intellectual Property Office, Republic of Korea.
"Touch Screen Display Device"; Abstract of Korean Publication 1020150019012; Publication Date: Feb. 25, 2015; http://kpa.kipris.or.kr.
Kim Sung Chul et al.; "Touch Screen Integrated Display Device and Method for Driving the Same"; Abstract of Korean Publication 1020140097892; Publication Date: Aug. 7, 2014; http://kpa.kipris.or.kr.
Bae Sang Hyuck et al.; "Touch Sensing Apparatus and Driving Method Thereof"; Abstract of Korean Publication 1020130143415; Publication Date: Dec. 31, 2013; http://kpa.kipris.or.kr.

* cited by examiner

DISPLAY APPARATUS

This application claims the benefit of Korean Patent Application No. 10-2015-0075985, filed on May 29, 2015, which is hereby incorporated by reference as if fully set forth herein.

BACKGROUND OF THE INVENTION

Field of the Invention

Embodiments of the present invention are related to an in-cell type display apparatus.

Discussion of the Related Art

For user convenience and sophistication of design, a display module having a touchscreen has been preferred to provide an input function in automated teller machines (ATMs), home appliances such as a TV, vehicle consoles, as well as portable electronic devices such as a cellular phone.

In recent times, a display device of an in-cell type in which elements constituting a touchscreen are mounted has been developed to a slim portable terminal.

SUMMARY OF THE INVENTION

Accordingly, the present invention is directed to a display apparatus that substantially obviates one or more problems due to limitations and/or disadvantages of the related art.

An object of the present invention is to provide a display apparatus which is capable of performing a stable initialization operation, preventing screen shaking or spots during display driving, and preventing touch sensing performance deterioration during touch sensing and/or signal driving operations thereof.

Additional advantages, objects, and features of the invention will be set forth in part in the description which follows and in part will become apparent to those skilled in the art upon examination of the following or may be learned from practice of the invention. The objectives and other advantages of the invention may be realized and attained by the structure(s) particularly pointed out in the written description and claims hereof as well as the appended drawings.

To achieve these objects and other advantages and in accordance with the purpose(s) of the invention, as embodied and broadly described herein, a display apparatus includes a panel in which a display operation and a touch sensing operation occur during one frame; and a controller configured to drive the panel during the display operation and during the touch sensing operation by time division, wherein the controller initializes the panel (i) before a start of the display operation and/or after an end of the display operation, and (ii) before a start of the touch sensing operation and/or after an end of the touch sensing operation.

The controller may be further configured to perform a first initialization, the display operation, a second initialization, a third initialization, the touch sensing operation, and a fourth initialization. The first initialization, the display operation, and the second initialization may be performed consecutively, and the third initialization, and the touch sensing operation, and the fourth initialization may be performed consecutively.

The second initialization and the third initialization may also be performed consecutively.

The fourth initialization of an $N^{th}$ frame (where N is a natural number) and the first initialization of an $(N+1)^{th}$ frame may also be performed consecutively.

The controller may be configured to sequentially and consecutively perform (i) a first initialization and the display operation, and (ii) a second initialization and the touch sensing operation.

Alternatively, the controller may be configured to sequentially and consecutively perform (i) the display operation and the first initialization, and (ii) the touch sensing operation and the second initialization.

A display apparatus according to one or more other embodiments may include a panel in which the display operation and the touch sensing operation occur during one frame, the panel including gate lines, data lines, display pixels, and common electrodes, the display pixels including transistors connected to the gate lines and the data lines and pixel capacitors connected to the transistors, the common electrodes being connected to the pixel capacitors. The panel may further include a data driver configured to provide a data signal to the data lines, a first selector configured to provide any one of a guarding signal and the data signal to the data lines, and a second selector configured to provide a touch driving signal, a common electrode voltage, or an initialization signal to the common electrodes. The display operation may further include a display initialization, and the touch sensing operation may further include a touch sensing initialization, wherein the display initialization may occur before a start of the display operation or after an end of the display operation, and the touch sensing initialization may occur before a start of the touch sensing operation or after an end of the touch sensing operation.

The first selector may selectively provide the data signal and the second selector may selectively provide the initialization signal during one or more of the initializations (e.g., the first selector may selectively provide the data signal during the display initialization, and the second selector may selectively provide the initialization signal during the touch sensing initialization). In further embodiments, the first selector may provide (i) the data signal when a first selection signal received by the first selector has a first state and (ii) the guarding signal when the first selection signal has a second state, and the second selector may provide (i) the touch driving signal when a second selection signal received by the second selector has a first state, (ii) the common electrode voltage when the second selection signal has a second state, and (iii) the initialization signal when the second selection signal has a third state. Thus, the first selection signal may be a single-bit signal, whereas the second selection signal may be a multi-bit (e.g., 2-bit) signal.

The first selector may selectively provide the data signal and the second selector may selectively provide the common electrode voltage during the display operation, and the first selector may selectively provide the guarding signal and the second selector may selectively provide the touch driving signal during the touch sensing operation.

The data signal may be a ground voltage or a black level during the display and/or touch sensing initialization, and the initialization signal may be identical to the data signal during the display and/or touch sensing initialization.

The guarding signal may be identical to the touch driving signal.

A method for driving a panel according to one or more embodiments includes driving the panel during a display operation of the panel; and driving the panel during a touch sensing operation of the panel, wherein the display operation and the touch sensing operation are performed during one frame by time division, driving the panel during the display operation includes a display process and a display initialization process, driving the panel during the touch sensing operation includes a touch sensing process and a touch sensing initialization process, the display initialization is performed before a start of the display process and/or after an end of the display process, and the touch sensing initialization process is performed before a start of the touch sensing operation and/or after an end of the touch sensing operation process.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle(s) of the invention. In the drawings.

DETAILED DESCRIPTION OF THE INVENTION

Figure 1A:
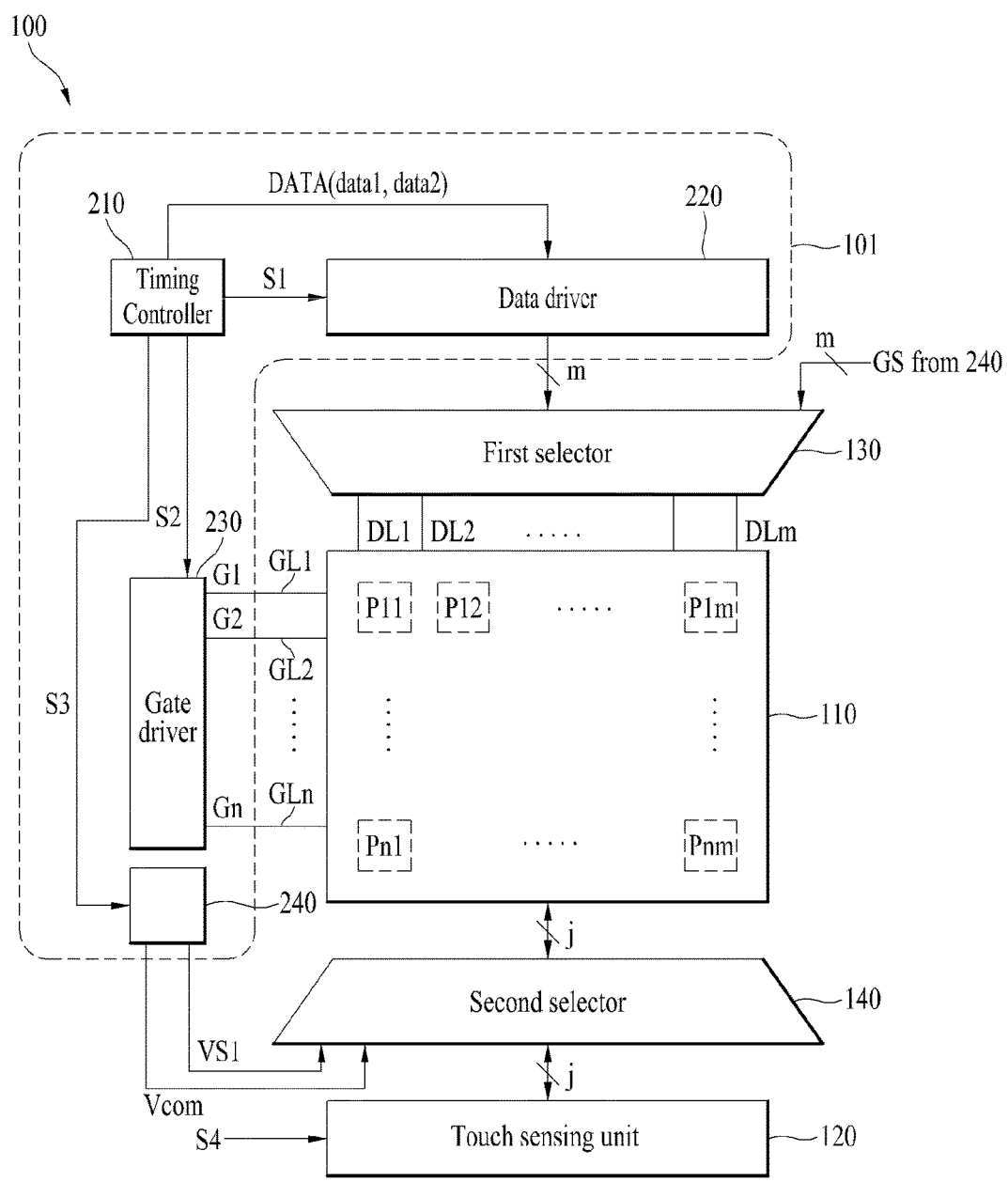
FIG. 1A illustrates a configuration of an exemplary display apparatus according to one or more embodiments.

Hereinafter, various embodiments of the invention will be clearly appreciated through the accompanying drawings and the following description thereof. In describing the following embodiments, it will be understood that, when an element such as a layer, film, region, pattern or structure is referred to as being formed "on" or "under" another element, such as a substrate, layer, film, region, pad or pattern, it can be directly "on" or "under" the other element, or be indirectly "on" or "under" the other element, with intervening elements therebetween. It will also be understood that "on" or "under" the element may be described relative to the drawings.

In the drawings, the size of each layer may be exaggerated, omitted or schematically illustrated for clarity and convenience. In addition, the size of each constituent element may not wholly reflect an actual or proportional size thereof. In addition, the same reference numerals designate the same constituent elements throughout the description of the drawings.

FIG. 1A illustrates an exemplary configuration of a display apparatus 100 according to one or more embodiments of the invention. The display apparatus 100 of FIG. 1 may be an in-cell type display apparatus.

Referring to FIG. 1A, the display apparatus 100 may include a panel 110, a timing controller 210, a data driver 220, a gate driver 230, a voltage generator 240, a touch sensing unit 120, a first selector 130, and a second selector 140.

The timing controller 210, the data driver 220, the gate driver 230, and the voltage generator 240 may be implemented as or controlled by a controller, which may be or comprise a display integrated circuit (IC) 101. The touch sensing unit 120 may also be implemented as an IC, without being limited thereto.

During a display operation of the panel 110, the controller 101 may drive the panel 110 (e.g., for the display operation), and during a touch sensing operation of the panel 110, the controller may drive the panel 110 again (e.g., for the touch sensing operation). In addition, the controller 101 may initialize the panel 100 (e.g., perform an initialization operation) in each of the display operation and the touch sensing operation. The initialization operation may be performed before the display operation (e.g., before the start of the display operation), after the display operation (e.g., after the display operation has ended), before the touch sensing operation (e.g., before the start of the touch sensing operation), and/or after the touch sensing operation (e.g., after the touch sensing operation has ended).

The panel 110 may be or comprise a display panel including a touchscreen. For example, the panel 110 may be an in-cell type panel that operates by an electrostatic capacitance scheme in which the display operation and the touch sensing operation are driven by time division during one frame (e.g., an operational frame, or time period during which a single display operation and a single touch sensing operation are performed).

Figure 1B:
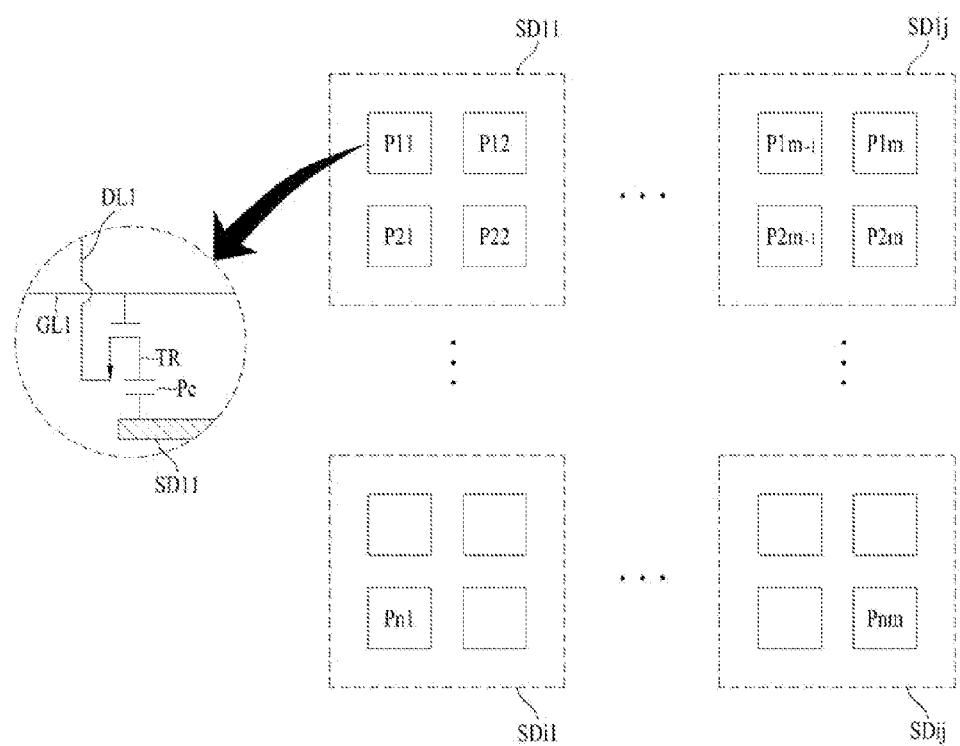
FIG. 1B illustrates an exemplary embodiment of a panel illustrated in FIG. 1A.

FIG. 1B illustrates an exemplary embodiment of the panel illustrated in FIG. 1A.

Referring to FIG. 1B, the panel 110 may include data lines DL1 to DLm (where m is a natural number greater than 1), gate lines GL to GLn (where n is a natural number greater than 1), and display pixels P11 to Pnm (where n and m are natural numbers greater than 1) configured to display one or more colors.

Each of the display pixels P11 through Pnm (where n and m are natural numbers greater than 1) may include a pixel capacitor Pc and a transistor TR. The transistor TR may include a gate connected to a gate line, a drain (or source) connected to a data line, and a source (or a drain) connected to one terminal of the pixel capacitor Pc.

The panel 110 may also include a plurality of common electrodes SD11 to SDij (where I and j are natural numbers greater than 1), each common electrode being connected to another terminal of each of the pixel capacitors Pc of the display pixels P11 to Pnm (where n and m are natural numbers greater than 1). Although in FIG. 1B, four adjacent pixels (e.g., P11, P12, P21, and P22, a 2×2 pixel block) may share one common electrode, other embodiments are not limited thereto, and may be implemented in various forms.

The panel 110 may be divided into two or more groups, and each of the two or more groups may include a plurality of display pixels. The display pixels belonging to each group may not overlap. Alternatively, the groups of display pixels may not share any pixels in common with each other.

Each of the common electrodes SD11 to SDij (where i and j are natural numbers greater than 1) may be commonly connected to terminals of the pixel capacitors Pc in one (e.g., SD11) of the groups of display pixels (e.g., P11 to P22).

For example, the panel 110 may be implemented such that a liquid crystal layer (not shown) is between two substrates (not shown), such as a higher substrate and a lower substrate. Gate lines GL1 to GLn (where n is a natural number greater than 1), data lines DL1 to DLm (where m is a natural number greater than 1), and transistors TR, pixel capacitors Pc, and common electrodes SD11 to SDij (where i and j are natural numbers greater than 1) may be formed on the lower substrate of the panel 110.

The common electrodes SD11 to SDij (where i and j are natural numbers greater than 1) may be used as electrodes for supplying a common voltage Vcom to the pixels P11 to Pnm (where n and m are natural numbers greater than 1) to drive the liquid crystal (e.g., cause the liquid crystal to transmit or block backlight) during a display operation and as electrodes to which a driving signal is applied during a touch sensing operation. For example, in the touch sensing operation, the common electrodes may serve as sensing nodes, coordinates, sensing points, nodes, or a sensing node array.

For the touch sensing operation, a change in self-capacitance or mutual capacitance is sensed using the common electrodes.

The gate lines may be termed gate electrodes, the data lines may be termed data electrodes, and the gate electrodes and the data electrodes may be termed display electrodes.

The above-described panel 110 has been implemented according to one or more embodiments of the invention, although a variety of in-cell type panels may be used according to other embodiments.

Referring back to FIG. 1A, the timing controller 210 may generate or provide a serial or multi-bit data signal DATA configured to drive the panel 110, a first control signal S1 configured to control the data driver 220, a second control signal S2 configured to control the gate driver 220, a third control signal S3 configured to control the voltage generator 240, and a fourth control signal S4 configured to control the touch sensing unit 120.

The data signal DATA may include an image data signal data1 for display driving and an initialization data signal data2 for initialization.

For example, the first control signal S1 may include a horizontal start signal, an enable signal, a clock signal CLK, a horizontal line signal (or a horizontal synchronization signal), or a frame signal (or a vertical synchronization signal), any of which may be input to a shift register in the data driver 220.

The frame signal may be a signal defining one frame (e.g., the duration or period of one frame, from the start to the end). The horizontal line signal may be a signal defining a duration or period of time in which the data signal DATA is written to pixels of one line in a pixel array of the panel 110. One period of the horizontal line signal may be set to one horizontal duration.

The data driver 220 may include a shift register, a latch unit, a level shifter, an analog-to-digital (or digital-to-analog) converter, and an output unit.

The shift register may provide a shift signal in response to an enable signal and a clock signal in order to control the timing at which the data signal DATA is stored in the latch unit. The latch unit may store the data signal DATA in response to the shift signal. The level shifter may shift the voltage level of the data signal DATA stored in the latch unit. The digital-to-analog converter may convert the level-shifted digital data signal DATA into an analog signal, and the analog-to-digital converter may convert an analog level-shifted data signal DATA into a digital signal. The output unit may amplify (or buffer) the analog signal from the digital-to-analog converter (or the digital signal from the analog-to-digital converter) and output the amplified (or buffered) analog or digital signal to data lines DL1 to DLm (where m is a natural number greater than 1).

The gate driver 230 may drive the gate lines GL1 to GLn (where n is a natural number greater than 1) in response to the second control signal S2.

For example, the gate driver 230 may output gate driving signals G1 to Gn (where n is a natural number greater than 1) to the gate lines GL1 to GLn (where n is a natural number greater than 1) in response to the second control signal S2. The transistors TR of the display pixels connected to one of the gate lines may be turned on or off by the gate driving signal (e.g., one of G1 to Gn, where n is a natural number greater than 1).

For example, the display pixels of the panel 110 may charge a voltage of the data signal from the data driver 220 when the horizontal line signal has a first level (e.g., a high binary logic level) in response to the gate driving signals G1 to Gn (where n is a natural number greater than 1), and maintain the voltage of the data signal when the horizontal line signal has a second level (e.g., a low binary logic level).

The voltage generator 240 may provide a common voltage Vcom for the display operation (or the display mode), an initialization signal VS1 for initialization, and a guarding signal GS configured to suppress or eliminate parasitic capacitance between a data line and a common electrode.

The touch sensing unit 120 may provide a touch driving signal TS1 to the common electrodes SD11 to SDij (where i and j are natural numbers greater than 1) during the touch sensing operation (or in the touch sensing mode) and sense a signal received from the common electrodes SD11 to SDij (where i and j are natural numbers greater than 1) according to a change in self-capacitance (e.g., of the common electrodes) or a change in mutual capacitance (e.g., between the common electrodes) caused by a touch operation.

The first selector 130 selects one of the data signal from the data driver 220 or the guarding signal GS from the voltage generator 240 in response to a first selection signal (e.g., see Se1 in FIG. 8, which may be provided by the timing controller 210), and provides the selected signal to the data lines DL1 to DLm (where m is a natural number greater than 1).

In this case, the data signal from the data driver 120 may include a first data signal and a second data signal.

The first data signal may be a signal from the data driver 120 based on the data signal data1 from the timing controller 210 (e.g., for the display operation). The second data signal may be a signal from the data driver 120 based on the data signal data2 from the timing controller 210 (e.g., for initialization).

Figure 8:
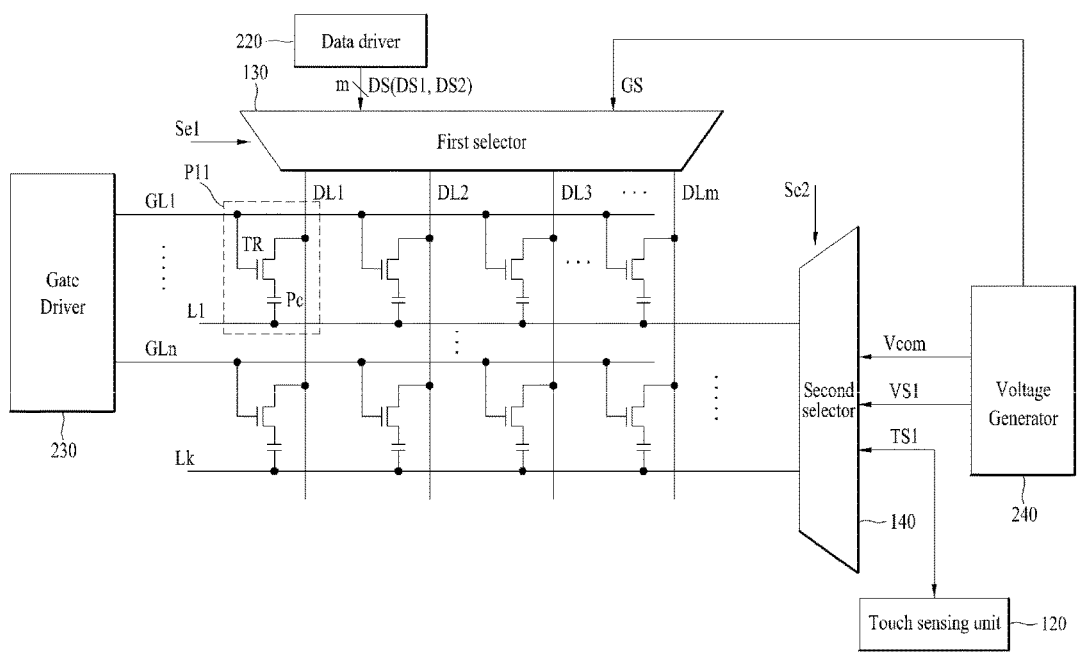
FIG. 8 illustrates an exemplary embodiment of a display apparatus configured to perform an initialization operation.

The second selector 140 may provide one of the touch driving signal TS1 from the touch sensing unit 120, the common electrode voltage Vcom from the voltage generator 240, or the initialization signal VS1 from the voltage generator 240 to the common electrodes SD11 to SDij (where i and j are natural numbers greater than 1) in response to a second selection signal (e.g., see Se2 in FIG. 8, which may be provided by the timing controller 210).

One frame of the display apparatus 100 may include a display operation and a touch sensing operation. At least one of the display operation and the touch sensing operation may include an initialization operation.

An initialization operation represents application of an initializing voltage to the pixel capacitors Pc of the display pixels P11 to Pnm (where n and m are natural numbers greater than 1) after the display operation or the touch sensing operation is completed. For example, the initialization operation sets the voltage applied to the pixel capacitors Pc to an identical predetermined value after the display operation or the touch sensing operation (e.g., after completion of the display operation or the touch sensing operation).

Such an initialization operation is used to reduce a mutual effect between the display operation and the touch sensing operation (e.g., an adverse effect of sequential, alternating display and touch sensing operations) in an in-cell panel.

For example, a voltage in each pixel capacitor Pc after a display operation is completed may not be constant, and this may affect the next touch sensing operation. Thus, the accuracy of the touch sensing operations may be lowered or less than an expected accuracy.

In addition, the voltage in each pixel capacitor Pc after the touch sensing operation may not be constant, and this may affect the next display operation. Thus, screen shaking or flickering may occur and/or spots may be generated on the touch and/or display screen.

Figure 2:
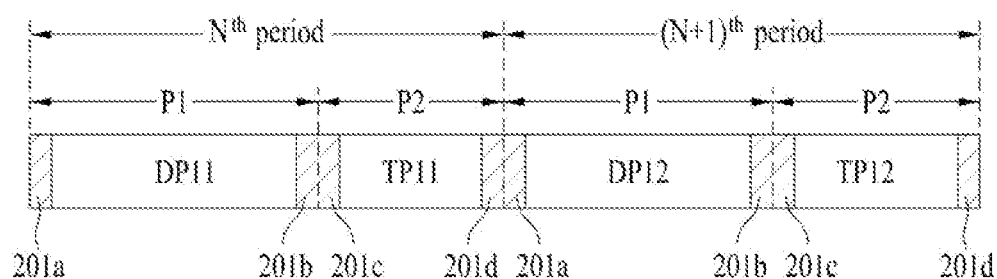
FIG. 2 illustrates an exemplary embodiment of an initialization operation in the display apparatus of FIG. 1A.

FIG. 2 illustrates an embodiment of an initialization operation of the display apparatus 100 illustrated in FIG. 1.

Referring to FIG. 2, each frame (e.g., an $N^{th}$ period or an $(N+1)^{th}$ period) may include a display operation P1 and a sensing operation P2. Initializations may be included in each of the display operation P1 and the sensing operation P2. In this case, N may be a natural number.

The display operation P1 and the sensing operation P2 may be distinguished by a mode control signal configured to distinguish between the display operation and the sensing operation.

The display operation P1 of each frame (e.g., in each of the $N^{th}$ period and the $(N+1)^{th}$ period) may include a first initialization 201a, a display operation (e.g., DP11 or DP12), and a second initialization 201b.

The display operation (e.g., DP11 or DP12) may be between the first initialization 201a and the second initialization 201b. The first initialization 201a, the display operation or process (e.g., DP11 or DP12), and the second initialization 201b may be sequential and consecutive (e.g., performed serially as a function of time).

For example, during the display operation (e.g., DP11 or DP12), the driving signals G1 to Gn (where n is a natural number greater than 1) may be provided to the gate lines gate lines GL11 to GLn (where n is a natural number greater than 1) by the gate driver 230, the data signal may be provided to the data lines DL1 to DLm (where m is a natural number greater than 1) by the data driver 220, and the common electrode voltage Vcom for the display operation may be provided to the common electrodes SD11 to SDij (where i and j>1 are natural numbers greater than 1).

The gate driver 230 may turn on the transistor TR of the display pixel Pc by applying the gate driving signals G1 to Gn (where n is a natural number greater than 1) to a corresponding one of the gate lines GL11 to GLn (where n is a natural number greater than 1), and a voltage of the data signal provided to the data lines DL1 to DLm (where m is a natural number greater than 1) by the data driver 220 may be stored in the pixel capacitor Pc connected to the turned-on transistor.

The touch sensing operation P2 of each frame (e.g., each of the $N^{th}$ period and the $(N+1)^{th}$ period) may include a third initialization 201c, the touch sensing operation or process (e.g., TP11 or TP12), and a fourth initialization 201d.

The touch sensing operation (e.g., TP11 or TP12) may be between the third initialization 201c and the fourth initialization 201d. The third initialization 201c, the touch sensing operation (e.g., TP11 or TP12), and the fourth initialization 201d may be sequential and consecutive (e.g., performed serially as a function of time).

During the touch sensing operation (e.g., TP11 or TP12), a driving signal (e.g., a touch sensing driving signal) for the touch sensing operation may be provided to the common electrodes SD11 to SDij (where i and j are natural numbers greater than 1).

The second initialization 210b of the display operation P1 and the third initialization 210c of the touch sensing operation P2 may be sequential and consecutive (e.g., performed serially as a function of time).

In addition, the fourth initialization 201d of the touch sensing operation P2 of the $N^{th}$ frame ($N^{th}$ period) and the first initialization 201a of the display operation P1 of the $(N+1)^{th}$ frame ($(N+1)^{th}$ period)) may be sequential and consecutive (e.g., performed serially as a function of time).

During each of the initializations 201a to 201d of the display operation P1 and the touch sensing operation P2, the data signal (e.g., having a common preset level) is simultaneously applied to or charged in the pixel capacitors of the pixels P11 to Pnm (where n and m are natural numbers greater than 1) of the panel 110. For example, the preset level of the data signal may be a ground voltage GND or a black level (e.g., a level corresponding to that of a black pixel, in which backlight may be blocked by the liquid crystal in the pixel).

Since the initialization operation is performed in both the display P1 and the touch sensing operation P2, the initialization operation can be stably performed, and thus, any adverse mutual effect between the display operation and the touch sensing operation can be reduced or eliminated. That is, embodiments of the invention can prevent screen shaking or and/or spots from occurring during display operations and prevent touch sensing performance from deteriorating during touch sensing operations, by performing a stable initialization operation.

Figure 3:
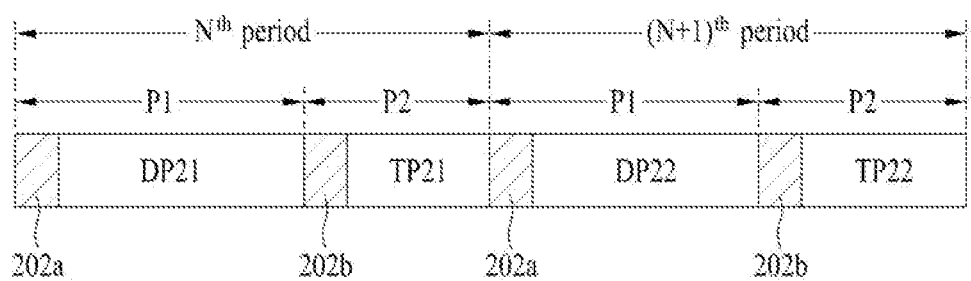
FIG. 3 illustrates another exemplary embodiment of an initialization operation in the display apparatus of FIG. 1A.

FIG. 3 illustrates another embodiment of an initialization operation in the display apparatus 100 of FIG. 1A.

Referring to FIG. 3, the display operation P1 in each frame (e.g., each of the $N^{th}$ period and the $(N+1)^{th}$ period) may include a first initialization 202a and the display operation or process (e.g. DP21 or DP22), and the touch sensing operation P2 may include a second initialization 202b and a touch sensing operation or process (e.g., TP21 or TP22).

The first initialization 202a and the display operation (e.g., DP21 or DP22) may be sequential and consecutive (e.g., performed serially as a function of time).

The second initialization 202b and the touch sensing operation (e.g., TP21, or TP22) may be sequential and consecutive (e.g., performed serially as a function of time).

In addition, the display operation (e.g., DP21 or DP22) and the second initialization 202b of the touch sensing operation P2 may be sequential and consecutive (e.g., performed serially as a function of time).

In addition, the touch sensing operation (e.g., TP21 or TP22) of the $N^{th}$ frame ($N^{th}$ period) and the first initialization 202a of the display operation P1 of the $(N+1)^{th}$ frame ($(N+1)^{th}$ period)) may be sequential and consecutive (e.g., performed serially as a function of time).

The description of the display operation (e.g., DP11 or DP12) of FIG. 2 may be identical to the display operation (e.g., DP21 or DP22) of FIG. 3, and the description of the touch sensing operation (e.g., TP11 or TP12) of FIG. 2 may be identical to the touch sensing operation (e.g., TP21 or TP22) of FIG. 3. The description of the first and third initializations of FIG. 2 may be identical to the first and second initializations of FIG. 3, respectively.

Figure 4:
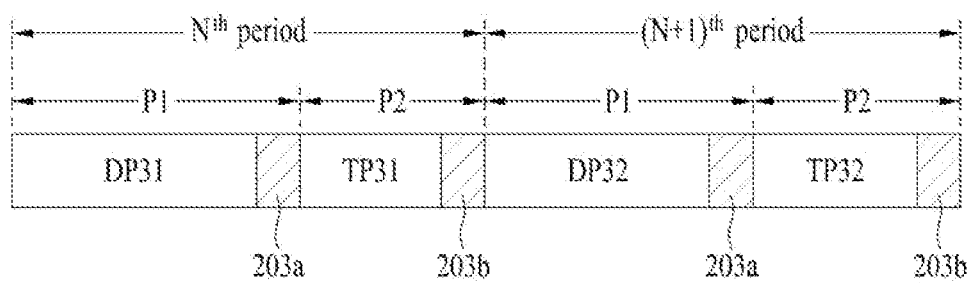
FIG. 4 illustrates another exemplary embodiment of an initialization operation in the display apparatus of FIG. 1A.

FIG. 4 illustrates another embodiment of an initialization operation in the display apparatus 100 of FIG. 1A.

Referring to FIG. 4, the display operation of P1 of each frame (e.g., each of the $N^{th}$ period and the $(N+1)^{th}$ period) may include a display operation or process (e.g., DP31 or DP32) and a first initialization 203a, and the touch sensing operation P2 may include a touch sensing operation or process (e.g., TP31 or TP32) and a second initialization 203b.

The display operation (e.g., DP31 or DP32) and the first initialization 203a may be sequential and consecutive (e.g., performed serially as a function of time).

Additionally, the touch sensing operation (e.g., TP31 or TP32) and the second initialization 203b may be sequential and consecutive (e.g., performed serially as a function of time).

In addition, the first initialization 203a of the display operation P1 and the touch sensing operation (e.g., TP31 or TP32) may be sequential and consecutive (e.g., performed serially as a function of time).

The second initialization 203b of the touch sensing operation P2 of the $N^{th}$ frame ($N^{th}$ period) and the display operation DP32 of the $(N+1)^{th}$ frame (($N+1)^{th}$ period)) may be sequential and consecutive (e.g., performed serially as a function of time).

The display operation (e.g., DP11 or DP12) of FIG. 2 may be identical to the display operation (e.g., DP31 or DP32) of FIG. 4, and the touch sensing operation (e.g., TP11 or TP12) of FIG. 2 may be identical to the touch sensing operation (e.g., TP31 or TP32) of FIG. 4. The first and third initializations of FIG. 2 may be identical to the first and second initializations of FIG. 4, respectively.

Figure 5:
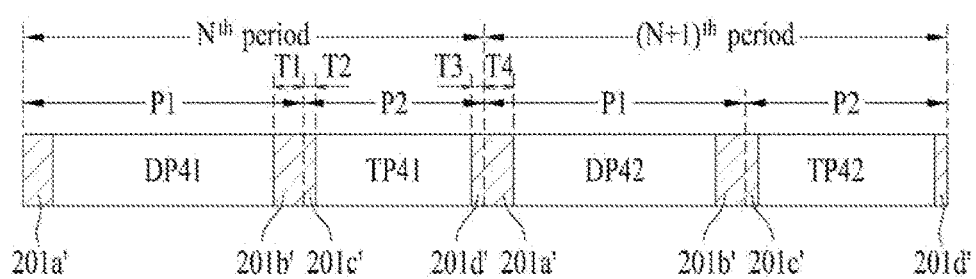
FIG. 5 illustrates another exemplary embodiment of an initialization operation in the display apparatus of FIG. 1A.

FIG. 5 illustrates another embodiment of an initialization operation in the display apparatus 100 of FIG. 1A. FIG. 5 may be a modified example of FIG. 2.

In FIG. 2, the durations of the first and second initializations 201a and 201b of the display operation P1 may be the same as the respective durations of the third and fourth initializations 201c and 201d of the touch sensing operation P2.

However, in FIG. 5, the duration or interval T4 of the first initialization 201a' in the display operation P1 may be different from the duration or interval T2 of the third initialization 201c' of the touch sensing operation P2. Similarly, the duration or interval T1 of the second initialization 201b' in the display operation P1 may be different from the duration or interval T3 of the fourth initialization 201d' of the touch sensing operation P2. For example, the durations or intervals T4 and/or T1 of the first and second initializations 201a' and 201b' in the display operation P1 may be from 1.1 to 5 times longer than the durations or intervals T2 and/or T3 of the third and fourth initializations 201c' and 201d' of the touch sensing operation P2, respectively.

For example, although the intervals T2 and T3 of the third and fourth initializations 201c' and 201d' of the touch sensing operation P2 may be shorter than the intervals T4 and T1 of the first and second initializations 201a' and 201b' of the display operation P1, embodiments of the invention are not limited thereto. Thus, alternatively, the interval T3 of the fourth initialization 201d' of the touch sensing operation P2 may be longer than the interval T1 of the second initialization 201b' of the display operation P1. The configuration of FIG. 4 can still ensure sufficient margin for the touch sensing operation because the touch sensing operation is shorter than the display operation.

Although the durations or intervals of the initializations 201a' and 201b' of the display operation P1 may be equal to each other, and the durations or intervals of the initializations 201c' and 201d' of the touch sensing operation P2 may be equal to each other, embodiments of the invention are not limited thereto. For example, the durations or intervals of the initializations 201a' and 201c' may be from 1.1 to 5 times greater than or less than the durations or intervals of the initializations 201b' and 201d', respectively.

Figure 6:
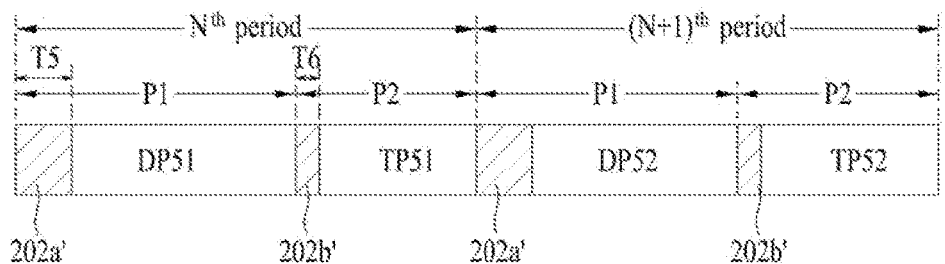
FIG. 6 illustrates another exemplary embodiment of an initialization operation in the display apparatus of FIG. 1A.

FIG. 6 illustrates another embodiment of an initialization operation in the display apparatus 100 of FIG. 1A. FIG. 6 may be a modified example of FIG. 3.

In FIG. 3, the duration or interval of the first initialization 202a of the display operation P1 is equal to the duration or interval of the first initialization 202b of the touch sensing operation P2.

On the other hand, in FIG. 6, the duration or interval T5 of the initialization 202a' of the display operation P1 may be different from the duration or interval T6 of the initialization 202b' of the touch sensing operation P2.

For example, although the duration or interval T6 of the initialization 202b' of the touch sensing operation P2 may be shorter than the duration or interval T5 of the initialization 202a' of the display operation P1 (e.g., from 1.1 to 5 times shorter), embodiments of the invention are not limited thereto. Thus, the duration or interval T6 of the initialization 202b' of the touch sensing operation P2 may be longer than the duration or interval T5 of the initialization 202a' of the display operation P1. The arrangement shown in FIG. 6 ensures sufficient margin for the touch sensing operation because the duration of the touch sensing operation P2 is shorter than the duration of the display operation P1.

Figure 7:
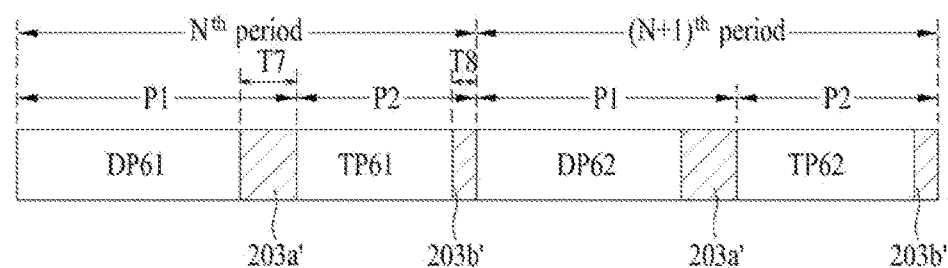
FIG. 7 illustrates another exemplary embodiment of an initialization operation in the display apparatus of FIG. 1A.

FIG. 7 illustrates another embodiment of an initialization operation in the display apparatus 100 of FIG. 1A. FIG. 7 may be a modified example of FIG. 4.

In FIG. 4, the duration or interval of the first initialization 203a of the display operation P1 is equal to the duration or interval of the second initialization 203b of the touch sensing operation P2.

On the other hand, in FIG. 7, the duration or interval T7 of the initialization 203a' of the display operation P1 may be different from the duration or interval T8 of the initialization 203b' of the touch sensing operation P2.

For example, although the duration or interval T8 of the initialization 203b' of the touch sensing operation P2 may be shorter than the duration or interval T7 of the initialization 203a' of the display operation P1 (e.g., from 1.1 to 5 times shorter), embodiments of the invention are not limited thereto. Thus, the duration or interval T8 of the initialization 203b' of the touch sensing operation P2 may be longer than the duration or interval T7 of the initialization 203a' of the display operation P1. The arrangement shown in FIG. 7 ensures sufficient margin for the touch sensing operation because the duration of the touch sensing operation P2 is shorter than the duration of the display operation P1.

FIG. 8 illustrates an exemplary embodiment of a display apparatus configured to perform an initialization operation.

Referring to FIG. 8, during the display operations in each frame (e.g., each of an $N^{th}$ period and an $(N+1)^{th}$ period), gate lines GL1 to GLn (where n is a natural number greater than 1) may be selectively driven by gate driving signals G1 to Gn (where n is a natural number greater than 1) from a gate driver 230.

During the display operations, a first data signal DS1 may be provided to a first selector 130 from a data driver 220, and the first selector 130 may selectively provide the first data signal DS1 to data lines DL1 to DLm (where m is a natural number greater than 1). The first selector 130 also receives a guarding signal GS from a voltage generator 240.

In addition, during the display operations, a second selector 140 may selectively provide a common electrode voltage Vcom from the voltage generator 240 to common electrodes L1 to Lk (where k is a natural number greater than 1). The second selector 140 also receives a touch driving signal TS1 from the touch sensing unit 120 and an initialization signal VS1 from the voltage generator 240.

During the display operations, the first selector 130 may selectively provide the first data signal DS1, and the second selector 140 may selectively provide the common electrode voltage Vcom.

During the touch sensing operations in each frame (e.g., each of an $N^{th}$ period or an $(N+1)^{th}$ period), the first selector 130 may provide the guarding signal GS from the voltage generator 240 to the data lines DL1 to DLm (where m is a natural number greater than 1). The guarding signal GS may be a signal identical to the touch driving signal TS. For example, the guarding signal GS may have at least one of a frequency, a phase, a shape, and an amplitude equal to that of the touch driving signal TS1.

For example, the guarding signal GS may have the same phase and amplitude as the touch driving signal TS1.

During the touch sensing operations, the first selector 130 may selectively provide the guarding signal GS, and the second selector 140 may selectively provide the touch driving signal TS1.

During the touch sensing operations, the guarding signal GS, which may be the same as the touch driving signal TS1, is provided to the data lines DL1 to DLm (where m is a natural number greater than 1). Therefore, parasitic capacitance between the data lines DL1 to DLm (where m is a natural number) and the common electrodes L1 to Lk (where k is a natural number greater than 1) can be suppressed or eliminated, and reliability of the touch sensing operation can be improved.

During the initializations (e.g., 201a to 203a, 201b to 203b, 201a' to 203a', 201b' to 203b', 201c' and 201d' in FIGS. 2-7) in the display and touch sensing operations in each frame (e.g., each of an $N^{th}$ period and an $(N+1)^{th}$ period)), all of the gate lines GL11 to GLn (where n is a natural number greater than 1) may be selected by the gate driving signals G1 to Gn (where n is a natural number greater than 1). Then, the transistors TR in each of the pixels P11 to Pnm (where n and m are natural numbers greater than 1) may all be turned on.

During the initializations (e.g., 201a to 203a, 201b to 203b, 201a' to 203a', 201b' to 203b', 201c', and 201d' in FIGS. 2-7), a second data signal DS2 may be provided to the first selector 130 from the data driver 220, and the first selector 130 may selectively provide the second data signal DS2 to the data lines DL1 to DLm (where m is a natural number greater than 1).

In addition, during the initializations, the second selector 140 may selectively provide the initialization signal VS1 to the common electrodes L1 to Lk (where k is a natural number greater than 1).

In this case, the initialization signal VS1 may be a signal identical to the second data signal DS2. For example, the initialization signal VS1 may be a ground voltage GND or have a black level (e.g., a level corresponding to that of a black pixel).

In the initializations (e.g., 201a to 203a, 201b to 203b, 201a' to 203a', 201b' to 203b', 201c', and 201d' as shown in FIGS. 2-7), the first selector 130 may selectively provide the second data signal DS2 to the pixels (e.g., to a source/drain terminal of each transistor TR), and the second selector 140 may selectively provide the initialization signal VS1 to the pixels (e.g., to an electrode of each capacitor Pc).

During the initializations', when the initialization signal VS1 provided to the common electrodes L1 to Lk (where k is a natural number greater than 1) is equal to the second data signal DS2 provided to the data lines DL1 to DLnm (where n and m are natural numbers greater than 1), the voltages applied to both electrodes of the capacitors Pc may be the same. Thus, the voltage differential across the capacitors Pc may be initialized to zero (0).

A method for driving the panel 110 by alternating between display operations and touch sensing operations through time division during each frame may include driving the panel 110 for the display operation of the panel 110 and driving the panel for the touch sensing operation of the panel 110. For example, driving the panel 110 for the display operation may comprise applying a binary logic level to a control terminal of each pixel (e.g., the gate of each transistor TR) in the panel 110, applying a data signal to the data lines of the panel 110, and applying a common voltage to the common electrodes of the panel 110. Although the common voltage may have any value from 0 V (e.g., a ground potential) to a positive full-rail voltage (e.g., Vcc, which may be from 3 V to 9 V), the common voltage generally has a value of from a threshold voltage (Vth) of the transistors TR (e.g., from about 0.2 V to about 0.7 V) to the positive full-rail voltage minus the threshold voltage of the transistors TR (e.g., from about 2.8 V to about 8.3 V, depending on the value of Vcc; in one example, Vcom=Vcc/2). Furthermore, driving the panel for the touch sensing operation may comprise applying a binary logic level to the control terminal of each pixel in the panel 110, applying a guarding signal to the data lines of the panel 110, and applying a touch sensing driving voltage to the common electrodes of the panel 110. In various embodiment, the guarding signal has a voltage equal to that of the touch sensing driving voltage (e.g., a ground potential or a voltage corresponding to that of a black pixel).

Driving the panel for the display operation may further include initializing the panel 110. For example, initializing the panel 110 for the display operation may comprise activating the control terminal of each pixel in the panel 110 (e.g., applying a binary logic level to the gate of each transistor TR that turns on each transistor TR), and applying an initialization voltage to the data lines and the common electrodes of the panel 110. In various embodiments, the initialization voltage may be a ground potential or a voltage corresponding to that of a black pixel.

Driving the panel for the touch sensing operation may also further include initializing the panel 110. Initializing the panel 110 for the touch sensing operation may also comprise activating the control terminal of each pixel in the panel 110 (e.g., applying the binary logic level to the gate of each transistor TR that turns on each transistor TR), and applying the initialization voltage to the data lines and the common electrodes of the panel 110.

The display initialization process may be performed before the display operation (e.g., before the start of the display operation) and/or after the display operation (e.g., after the end of the display operation).

The touch sensing initialization process may be performed before the touch sensing operation process (e.g., before the start of the touch sensing operation) and/or after the touch sensing operation process (e.g., after the end of the touch sensing operation).

For example, in one or more embodiments, the display initialization process may include a first initialization before the start of the display operation, and a second initialization after the end of the display operation. The first initialization process, the display operation, and the second initialization process may be sequential and consecutive (e.g., performed serially as a function of time). In addition, for example, the touch sensing initialization process may include a third initialization process before the start of the touch sensing operation, and a fourth initialization process after the end of the touch sensing operation. The third initialization process, the touch sensing operation, and the fourth initialization process may be sequential and consecutive (e.g., performed serially as a function of time). The statements described with regard to FIG. 2 may be applied to such embodiment(s).

In one or more other embodiments, a display initialization process may be before the start of the display operation, and a touch sensing initialization process may be before the start of the touch sensing operation. In this case, the display initialization process, the display operation, the touch sensing initialization process, and the touch sensing operation may be sequential and consecutive (e.g., performed serially as a function of time). The statements described with regard to FIG. 3 may be applied to such embodiment(s).

In one or more further embodiments, the display initialization process may be after the end of the display operation, and the touch sensing initialization process may be after the end of the touch sensing operation. In this case, the display operation, the display initialization process, the touch sensing operation, and the touch sensing initialization process may be sequential and consecutive (e.g., performed serially as a function of time). The statements described with regard to FIG. 4 may be applied to such embodiment(s).

The statements described with regard to FIGS. 5 to 7 may be applied to these and other embodiments.

As described above, a mutual effect between the display operation P1 and the touch operation P2 is reduced by initializing the voltage on both electrodes or terminals of the pixel capacitors Pc in the panel 110 during initialization. Therefore, embodiments of the invention can prevent screen shaking and/or generation of spots on the panel or screen during display driving operations and prevent deterioration of touch sensing performance during touch sensing driving operations.

Features, structures, effects, and the like as described above in the embodiments are included in at least one embodiment of the present invention and should not be limited to only one embodiment. In addition, the features, structures, effects, and the like described in the respective embodiments may be combined or modified even with other embodiments by those skilled in the art. Accordingly, contents related to these combinations and modifications should be construed as being within the scope of the present invention.

What is claimed is:

1. A display apparatus comprising:
a panel in which a display operation and a touch sensing operation occur during one frame; and
a controller configured to drive the panel during the display operation and during the touch sensing operation by time division,
wherein the controller is configured to perform (i) a first initialization, the display operation, and a second initialization consecutively, (ii) a third initialization, the touch sensing operation, and a fourth initialization consecutively, and (iii) the second initialization and the third initialization consecutively.

2. The display apparatus according to claim 1,
wherein the fourth initialization of an Nth frame (where N is a natural number) and the first initialization of an (N+1)th frame are performed consecutively.

3. A display apparatus comprising:
a panel in which a display operation and a touch sensing operation occur during one frame, the panel including gate lines, data lines, display pixels, and common electrodes, the display pixels including transistors connected to the gate lines and the data lines and pixel capacitors connected to the transistors, the common electrodes being connected to the pixel capacitors;
a data driver configured to provide a data signal to the data lines;
a first selector configured to provide any one of a guarding signal and the data signal to the data lines; and
a second selector configured to provide any one of a touch driving signal, a common electrode voltage, and an initialization signal to the common electrodes,
wherein the display operation further includes a first initialization, a display process and a second initialization, and the touch sensing operation includes a third initialization, a touch sensing process and a fourth initialization, and
the first initialization, the display process, and the second initialization are performed consecutively, the third initialization, the touch sensing process, and the fourth initialization are performed consecutively, and the second initialization and the third initialization are performed consecutively.

4. The display apparatus according to claim 3,
wherein the first selector selectively provides the data signal during the first and second initializations, and the second selector selectively provides the initialization signal during the third and fourth initializations.

5. The display apparatus according to claim 4,
wherein the first selector selectively provides the data signal and the second selector selectively provides the common electrode voltage during the display process, and
the first selector selectively provides the guarding signal and the second selector selectively provides the touch driving signal during the touch sensing process.

6. The display apparatus according to claim 4,
wherein the data signal has a ground voltage or a black level during the first and second initializations, and the initialization signal is identical to the data signal during the third and fourth initializations.

7. The display apparatus according to claim 4,
wherein the guarding signal is identical to the touch driving signal.

8. The display apparatus according to claim 4, wherein:
the first selector provides (i) the data signal when a first selection signal received by the first selector has a first state and (ii) the guarding signal when the first selection signal has a second state, and
the second selector provides (i) the touch driving signal when a second selection signal received by the second selector has a first state, (ii) the common electrode voltage when the second selection signal has a second state, and (iii) the initialization signal when the second selection signal has a third state.

9. The display apparatus according to claim 3, wherein the fourth initialization of an Nth frame (where N is a natural number) and the first initialization of an (N+1)th frame are performed consecutively.

10. A method for driving a panel, comprising:
    driving the panel during a display operation of the panel; and
    driving the panel during a touch sensing operation of the panel,
    wherein the display operation and the touch sensing operation are performed during one frame by time division,
    driving the panel during the display operation includes a first initialization, a display process and a display second initialization,
    driving the panel during the touch sensing operation includes a third initialization, a touch sensing process and a fourth initialization,
    the first initialization, the display process, the second initialization, the third initialization, the touch sensing process, and the fourth initialization are is performed consecutively during the one frame.

11. The method according to claim 10, wherein each of the first initialization, the second initialization the third initialization, and the fourth initialization comprises initializing the panel.

12. The method according to claim 11, wherein initializing the panel during the first and second initializations comprises activating a control terminal of each pixel in the panel, and applying an initialization voltage to data lines and common electrodes of the panel.

13. The method according to claim 12, wherein the initialization voltage is a ground potential or a voltage corresponding to that of a black pixel.

14. The method according to claim 12, wherein initializing the panel during the third and fourth initializations comprises activating the control terminal of each pixel in the panel, and applying the initialization voltage to the data lines and the common electrodes of the panel.

15. The method according to claim 10, further comprising performing the fourth initialization of an Nth frame (where N is a natural number) and the first initialization of an (N+1)th frame consecutively.

* * * * *